(12) United States Patent
Lam et al.

(10) Patent No.: US 6,879,740 B2
(45) Date of Patent: Apr. 12, 2005

(54) OPTICAL SPACE SWITCH

(75) Inventors: Yee Loy Lam, Singapore (SG); Yuen Chuen Chan, Singapore (SG); Peh Wei Tan, Singapore (SG); Bee Khuan Law, Singapore (SG)

(73) Assignee: Denselight Semiconductor PTE LTD, Singapore (SG)

( * ) Notice: Subject to any disclaimer, the term of this patent is extended or adjusted under 35 U.S.C. 154(b) by 0 days.

(21) Appl. No.: 10/288,703

(22) Filed: Nov. 6, 2002

(65) Prior Publication Data

US 2003/0103711 A1 Jun. 5, 2003

(30) Foreign Application Priority Data

Nov. 6, 2001 (GB) .............................................. 0126640

(51) Int. Cl.[7] .......................................... G02F 1/295
(52) U.S. Cl. .......................................... 385/8; 385/129
(58) Field of Search .............................. 385/8, 129–132

(56) References Cited

U.S. PATENT DOCUMENTS

| | | | |
|---|---|---|---|
| 3,320,013 A | | 5/1967 | Johnson |
| 4,070,092 A | * | 1/1978 | Burns .......................... 385/45 |
| 4,127,320 A | | 11/1978 | Li |
| 4,145,109 A | | 3/1979 | Nelson |
| 4,172,630 A | | 10/1979 | Burns et al. |
| 4,181,399 A | | 1/1980 | McMahon et al. |
| 4,775,207 A | * | 10/1988 | Silberberg ...................... 385/8 |
| 5,048,907 A | * | 9/1991 | Wickman et al. .............. 385/2 |
| 5,455,433 A | * | 10/1995 | Komatsu ...................... 257/95 |
| 5,537,497 A | | 7/1996 | Nelson |
| 5,970,186 A | | 10/1999 | Kenney et al. |
| 5,991,475 A | | 11/1999 | Nelson |
| 6,064,787 A | * | 5/2000 | Castoldi ....................... 385/41 |
| 6,094,516 A | | 7/2000 | Nolting et al. |
| 6,381,060 B1 | * | 4/2002 | Romanovsky .............. 359/245 |

OTHER PUBLICATIONS

Simonis, G.J. et al., "Theoretical and experimental comparison of an adjustable Y–junction switch", Dec. 15, 1994; vol. 19; No. 24; Pub. No. 0146–9592; Optical Society of America; pp. 2107–2109.

Huang, T.C. et al., "A Y–Junction Optical Switch Based on Field–Induced Control of Refractive Index", Jun. 6, 1993; vol. 5; No. 6; Pub. No. 1041–1135; IEEE Photonics Technology Letters; pp. 712–715.

Stöhr, A. et al., "An InGaAs/GaAs MQW Optical Switch Based on Field–Induced Waveguides", Jul. 1994; vol. 6; No. 7; Pub. No. 1041–1135; IEEE Photonics Technology Letters; pp. 828–830.

* cited by examiner

Primary Examiner—Mark Tremblay
(74) Attorney, Agent, or Firm—Buckley, Maschoff & Talwalkar LLC

(57) ABSTRACT

A device for optical space switching in optical networks. The optical device comprises a broad area optical waveguide section having a number of electrodes extending over at least a portion of the length of the broad area optical waveguide section. The application of an electrical signal to an electrode causes a local change in effective refractive index of the broad area optical waveguide section, thereby causing light preferentially to propagate along a predetermined path in dependence on the configuration of the electrode. In particular the broad area waveguide device is implemented in indium phosphide (InP).

Also described is a method for waveguiding in the optical device.

18 Claims, 17 Drawing Sheets

OPTICAL SPACE SWITCH

This application is a U.S. National filing under 35 U.S.C. §119 hereby claiming priority to GB Application No. 0126640.2, filed Nov. 6, 2001, the contents of which are incorporated herein by reference for all purposes.

FIELD OF THE INVENTION

The present invention relates to devices for optical space switching in optical networks and in particular to devices based on broad area waveguides implemented in indium phosphide.

BACKGROUND OF THE INVENTION

Optical space switches are widely required for the routing of optical signals in modern optical networks, particularly in systems operating by wavelength division multiplexing (WDM), and there are various different approaches and materials for realizing them. The material systems typically used in the fabrication of optical space switches include polymers, silica, silicon on silica (SOI), lithium niobate and III–V semiconductor. Polymers and silica based switches using the thermo-optic effect are inherently slower than other types. Devices which operate via the electro-optic effect in lithium niobate or by using electro-optic polymers, suffer from critical stability of their switching characteristics under the applied electric field used to control them. Indium phosphide (InP) based semiconductor is, therefore, a preferred material for the fabrication of optical switches, as it has the advantages of high speed and compatibility with other InP based devices.

Optical switches implemented in a semiconductor planar waveguide structure can be classified into three broad categories, namely the direct coupler, the gain switch and the index switch. The direct coupler type functions by constructive and destructive interference of light propagating between different channels. The gain switch amplifies light in the desired channel and absorbs light in the non-desired channel. Finally, the optical index switch operates by reflecting or focusing light via a local change in the refractive index, which is induced by the injection of electric current or the application of an electric field. One of the most promising candidates among the various types of optical index switch is the digital optical switch (DOS). The state of the art DOS consists of very narrow angled Y-branches or X-crossing with electrodes placed in various configurations on strategic locations at the proximity of the branching point. Various implementations and optimizations of such switches are disclosed in U.S. Pat. No. 6,094,516, U.S. Pat. No. 5,970,186, U.S. Pat. No. 5,537,497 and U.S. Pat. No. 5,991,475.

SUMMARY OF THE INVENTION

According to the present invention, there is provided an optical device comprising a broad area optical waveguide section having a number of electrodes extending over at least a portion of the length of the broad area optical waveguide section, wherein the application of an electrical bias to an electrode causes a local change in effective refractive index of the broad area optical waveguide section, thereby causing light preferentially to propagate along a predetermined path in dependence on the configuration of the electrode.

In the present invention, we provide an optical space switch for the routing of optical signals comprising a broad area waveguide, with at least one input port and at least one output port, in which regions of localized transverse optical confinement can be created via an electrically-induced refractive index change using an electrical signal applied by means of suitably shaped electrodes located above, and in close proximity to, the broad area waveguide structure.

Preferably, the broad area waveguide features a lateral taper along its length. A wide-angle taper allows light to be efficiently gathered in a large but well-defined area.

Preferably, the input and output ports comprise optical waveguides. More preferably, the input and output ports comprise optical waveguides with a lateral taper along their length. This ensures efficient coupling of light to and from the broad area waveguide.

The creation of localized lateral optical confinement (waveguide), within the broad area waveguide, can be achieved by the application of an electric field across part of the waveguide structure or by the injection of electric current into the structure. The application of a reverse bias electric field leads to a local increase in the material refractive index, typically via the electro-optic effect, resulting in the collection of light from regions of lower index. Conversely, the injection of current leads to a local decrease in the material refractive index, resulting in the flow of light away to regions of higher (original) index.

In either case, the application of an electrical signal leads to the creation of local optical waveguides, within the broad area waveguide, which can be used to route optical signals between various input and output ports. The lateral dimensions of the induced waveguides will depend on the shape and size of the electrodes, which may be segmented to provide more complex confinement structures. As an example, the electrodes may feature a lateral taper in order to induce small tapered waveguides within a broad area waveguide, which may also be tapered. Tapered waveguides are useful for adiabatically changing the size of an optical beam on propagation through the waveguide.

Due to the speed of response and compatibility with other optical devices, it is preferred that the optical space switch comprises a heterostructure based on indium phosphide (InP) semiconducting materials.

The strength of response of the device to the applied electrical signal, particularly the electro-optic effect, can be increased by the inclusion of a quantum well (QW) or multiple quantum well (MQW) structure within the device. This permits efficient switching between ports to be achieved, with high extinction ratio at a lower electrical signal strength.

It is therefore preferred that at least part of the device heterostructure, in proximity to an electrode, contains at least one quantum well.

A multiple output port version of the device can be fabricated with the heterostructure of the waveguide designed for compatibility with an arrayed-waveguide grating (AWG), as used for channel monitoring. In this application the switch would function as an interleaver, thereby greatly reducing the size of the AWG and the level of performance demanded from it.

Alternatively, a single output embodiment of the present invention may be used as an optical modulator, whereby the transmission of light by the device is either high or low, depending on the applied electrical signal. An optical modulator based on the present invention would be intrinsically broadband, high speed, low loss and polarization insensitive.

BRIEF DESCRIPTION OF THE DRAWINGS

Examples of the present invention will now be described in detail with reference to the accompanying drawings, in which.

DETAILED DESCRIPTION

A number of configurations and applications of the optical space switch have been designed, in accordance with the present invention. In each case, simulations have been performed to model the propagation of light in the electrically induced waveguides. The simulations allowed the characteristics of the resulting switching behavior to be calculated as a function of various physical parameters. Throughout the Figures dimensions (in μm) are given. As will be clearly understood, all dimensions given in the figures are values adopted in simulations. They are given for illustrative purposes only and are not intended to limit the scope of the invention.

Figure 1:
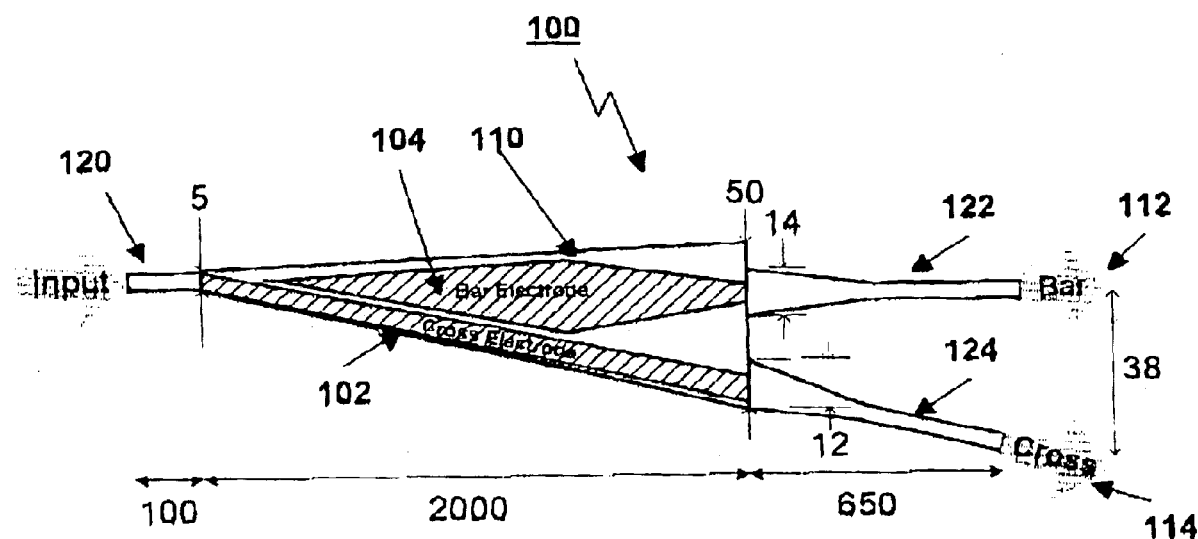
FIG. 1 shows a first embodiment of the present invention, a 1×2 voltage controlled switch.

FIG. 1 shows a first embodiment of the present invention, which is configured to operate as a 1×2 switch 100 when a reverse bias voltage is applied. The device functions by switching the propagation of a light signal between a path that is well defined by a crossing electrode 102, the cross state 114, to one that provides near adiabatic propagation under a wide tapered electrode 104, the bar state 112. By activating the appropriate electrode, switching can be achieved between the two paths. This device layout presents no outstanding fabrication difficulties, as the electrodes 102, 104 do not need to be placed extremely close to each other. This is not the case in conventional digital optical switches, using Y-branches, where the proximity of electrodes defining the different optical paths is often paramount to the switching performance. The optical properties of tapered waveguides are also much more robust to small variations in device dimensions, as compared to Y-branches.

Figure 2:
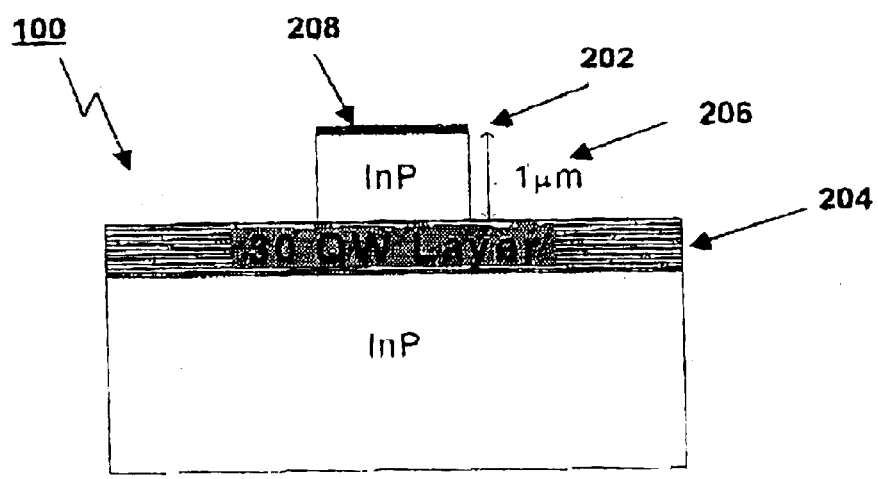
FIG. 2 is a cross section through the heterostructure of FIG. 1.

The device of FIG. 1 comprises a ridge 202 located above a thirty quantum-well (30 QW) heterostructure 204, as shown schematically in the cross section of FIG. 2. The thirty quantum-well active layer 204 has a bandgap energy corresponding to a wavelength of 1.4 μm. The extent of the broad area waveguide taper region 110, as well as that of the input 120 and output waveguide ports 122, 124, is defined by an etching of a cladding layer 206, which uses the quantum-well active layers 204 as the etch stop. The two electrodes 102, 104 are then defined on top of the contact layer 208. The refractive index change in the active layer 204, in response to a reverse bias voltage, is typically in the range of $1 \times 10^{-4}$ to $2 \times 10^{-3}$.

Figure 3:
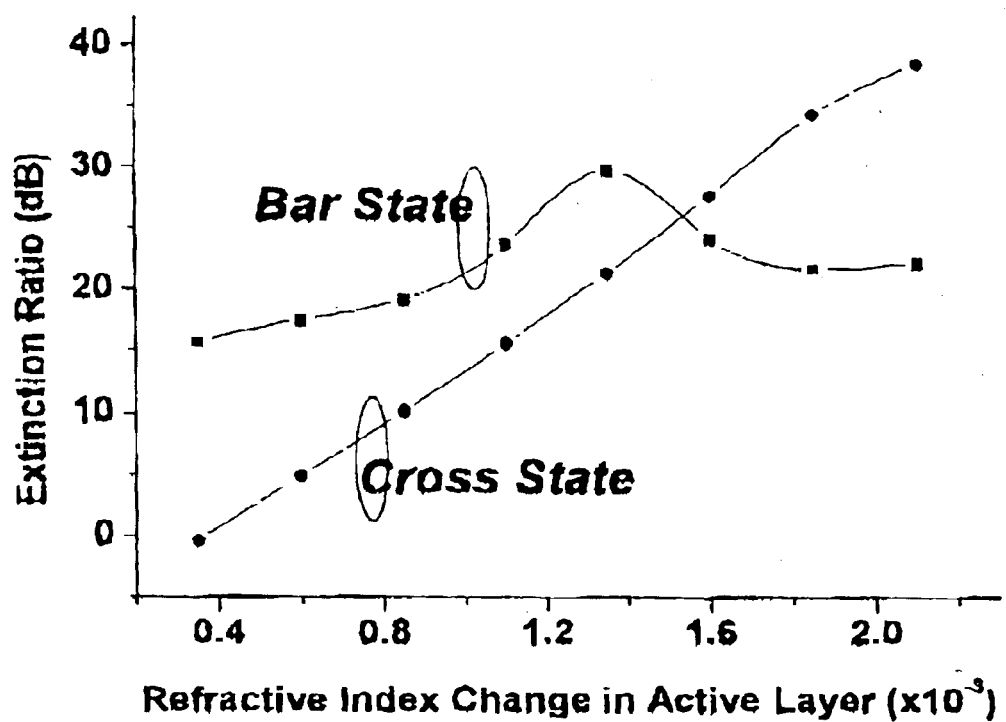
FIG. 3 shows extinction ratio versus refractive index change of the bar and cross states, for the switch of FIG. 1.
Figure 4:
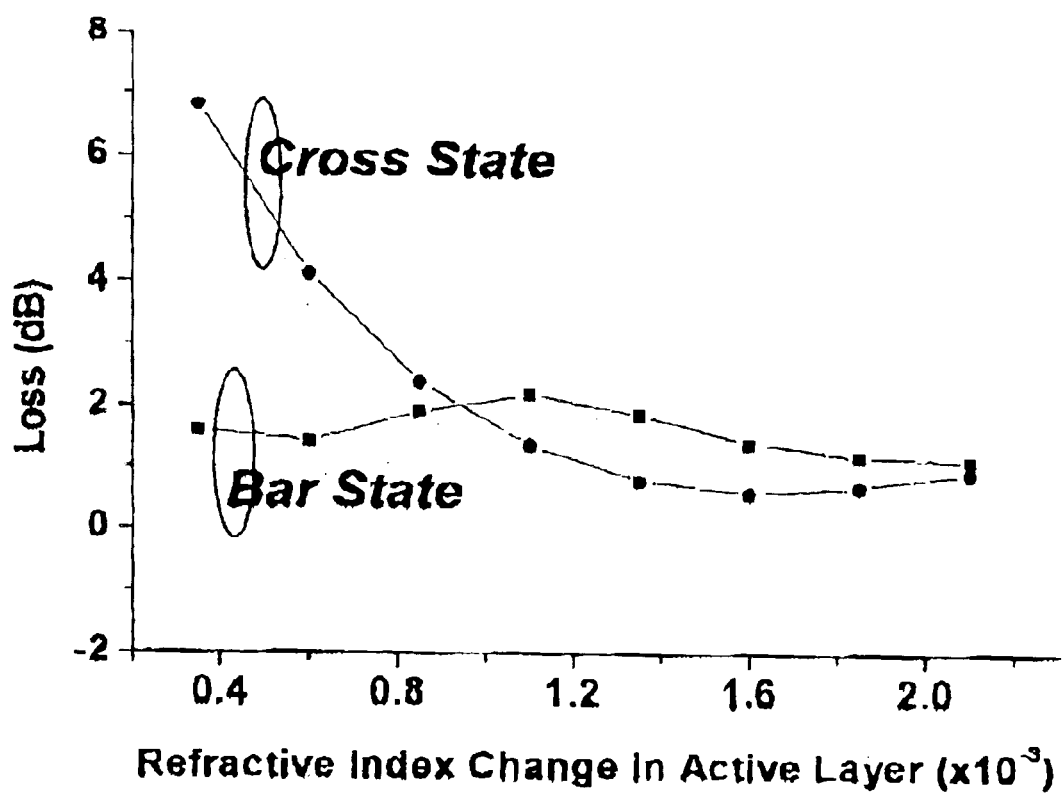
FIG. 4 shows propagation loss versus refractive index change of the bar and cross states, for the switch of FIG. 1.

The extinction ratio of this device is defined as the ratio of optical power transmitted by the targeted output port to that transmitted by the non-targeted output port, expressed in decibels. The extinction ratio, for the bar 112 and cross 114 states of operation, is plotted against electrically induced refractive index change in FIG. 3. It can be seen that an extinction ratio of up to 30 dB can be attained with a refractive index change of $1.5 \times 10^{-3}$. The corresponding loss for this range of refractive index change is shown in FIG. 4. At a refractive index change of $1.5 \times 10^{-3}$ in the active layer, the losses for bar state 112 and cross state 114 propagation are 1.5 dB and 0.6 dB, respectively.

Figure 5:
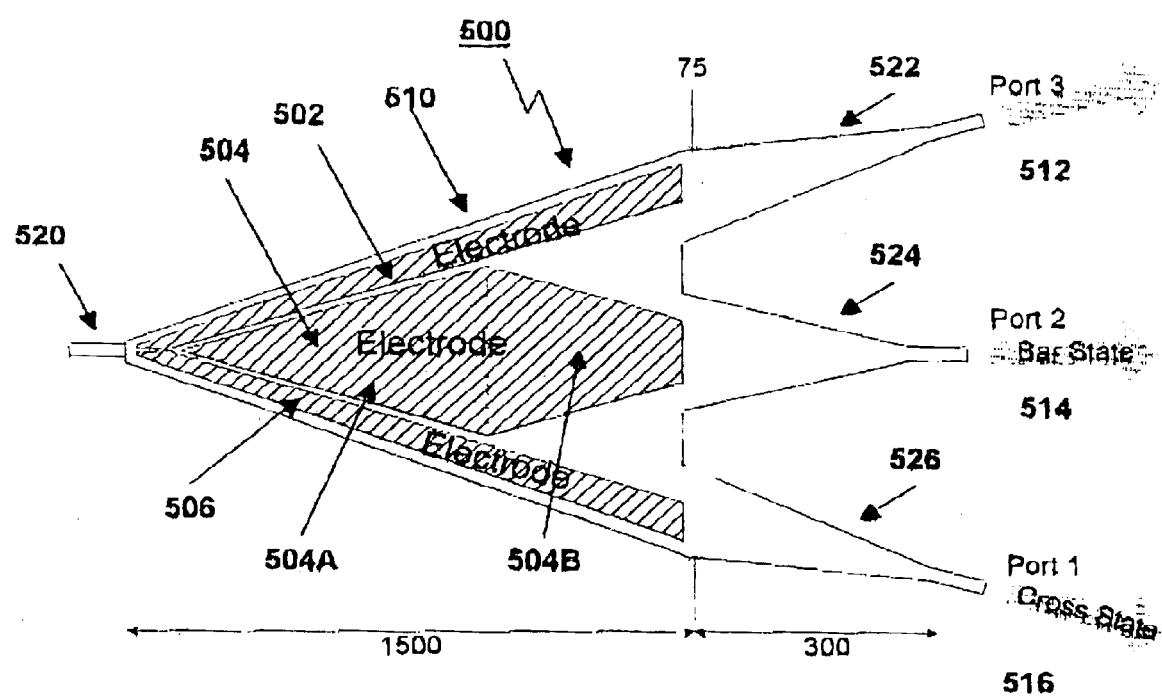
FIG. 5 shows a second embodiment of the present invention, a 1×3 voltage controlled switch.

In a second embodiment 500 of the present invention, the device is configured to operate as a 1×3 switch when a reverse bias voltage is applied, as shown in FIG. 5. Light enters the device via a 3 μm wide input waveguide 520 and is coupled into a 1500 μm long broad area waveguide 510, which is tapered so as to increase in width from 5 μm at the input 520 to 75 μm at the output. Light is coupled from the output of the broad area waveguide 510 via 300 μm long tapered access waveguides 522, 524, 526, which have a width of 18 μm slowly reducing to 3 μm. The final output waveguides are 3 μm wide, thereby matching the input waveguide dimension. Located above the broad area waveguide 510 are two side electrodes 502, 506, each with a width that increases from 2 μm to 8 μm, and a larger central electrode 504, with two oppositely tapered sections 504A, 504B that have a maximum width of 12 μm.

Figure 6:
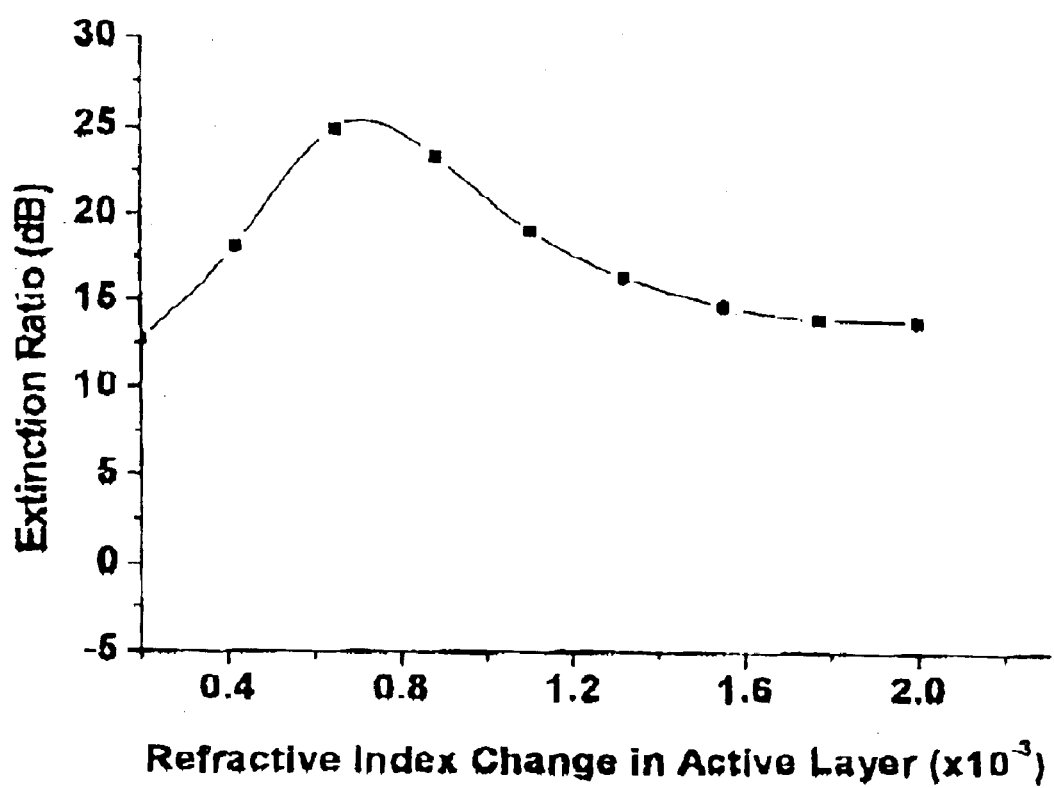
FIG. 6 shows extinction ratio versus refractive index change of the bar state, for the switch of FIG. 5.
Figure 7:
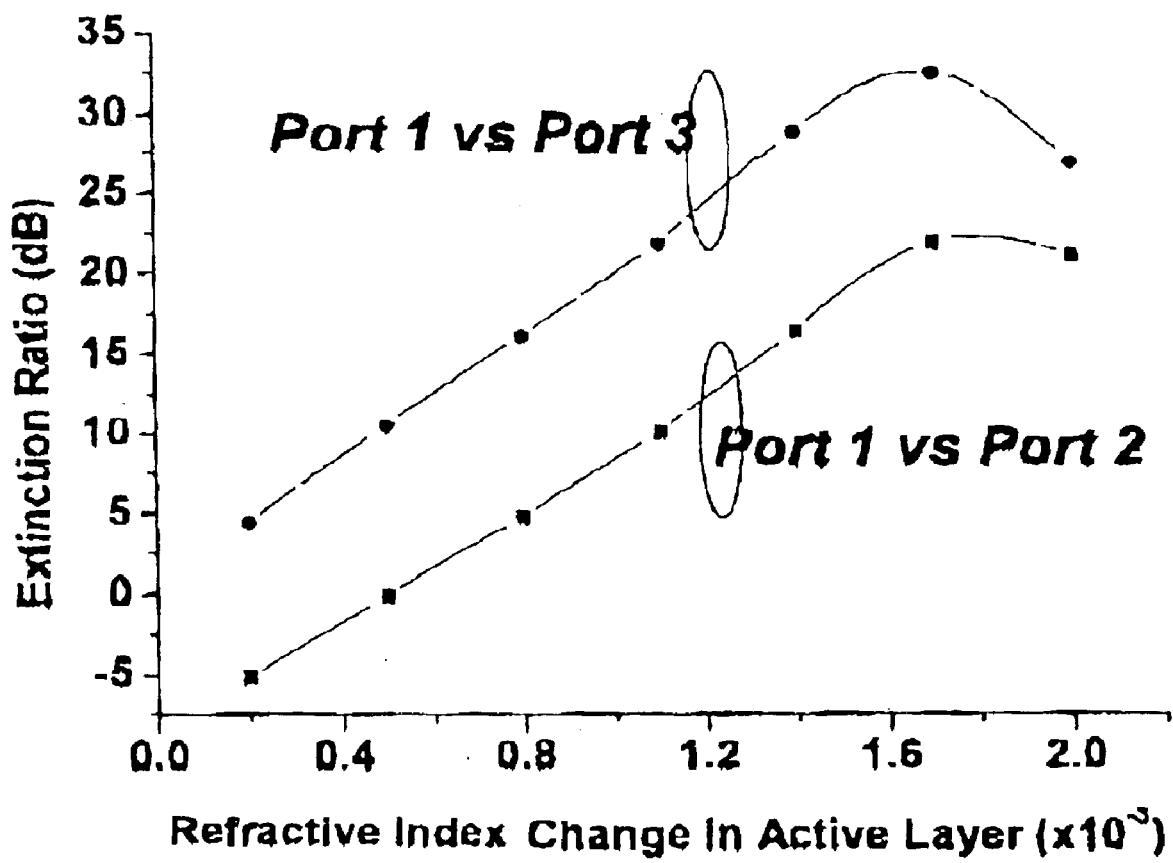
FIG. 7 shows extinction ratio versus refractive index change of the cross state, for the switch of FIG. 5.
Figure 8:
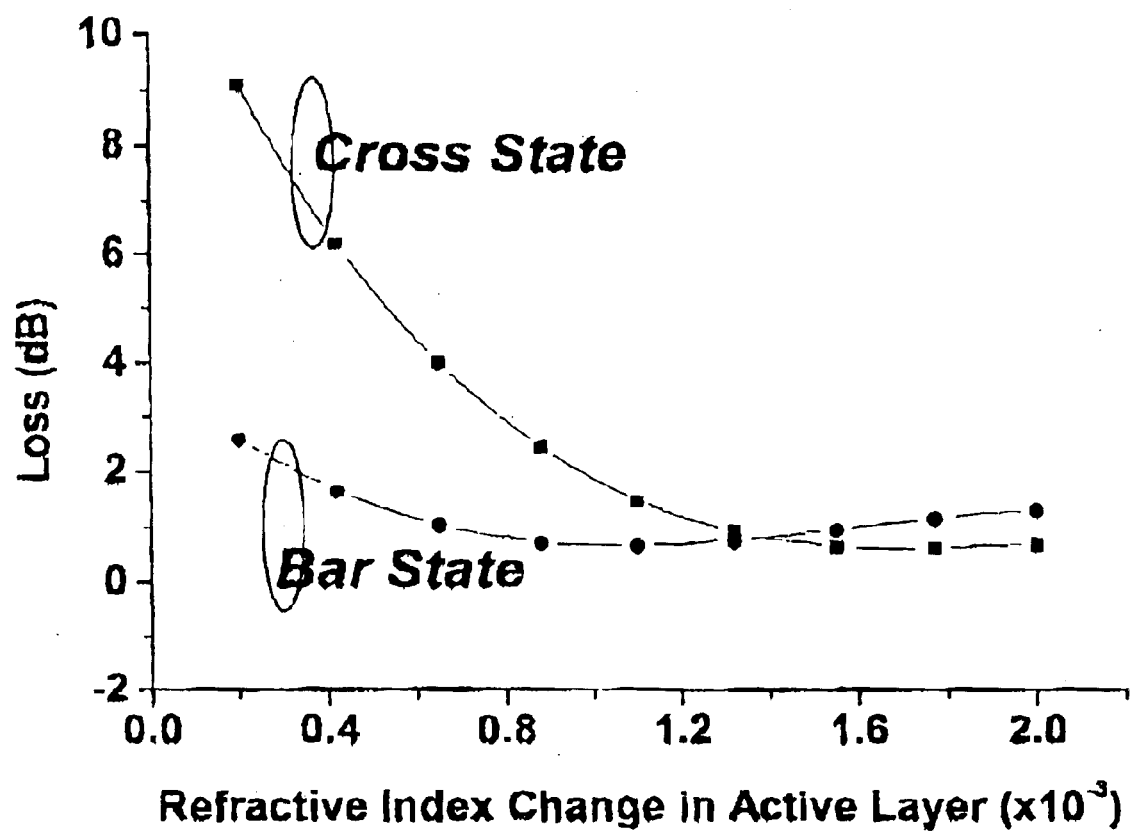
FIG. 8 shows propagation loss versus refractive index change of the bar and cross states, for the switch of FIG. 5.

The extinction ratios that can be obtained in this three-way configuration, for the bar and cross states 512, 514, 516, are shown in FIGS. 6 and 7 for a range of induced refractive index change. It can be seen that an extinction ratio of 25 dB can be obtained for the bar state 514 while an extinction ratio of over 20 dB can be obtained for the cross state 516 transmitted at port 1. The difference between the extinction ratios of bar and cross states can also be optimized by adjusting the respective sizes and dimensions of the electrodes 502, 504, 506. Further optimization can also be performed by adjusting the dimensions of the respective access waveguides 522, 524, 526. For example, a reduction in the dimension of the mouth of the access tapers would improve the extinction ratio, but at the expense of higher loss. The loss performance of the three-way switch is shown in FIG. 8 as a function of the induced refractive index change. It can be seen that, by appropriate choice of index change, propagation loss can be reduced below 1 dB, while maintaining a high extinction ratio.

Figure 9:
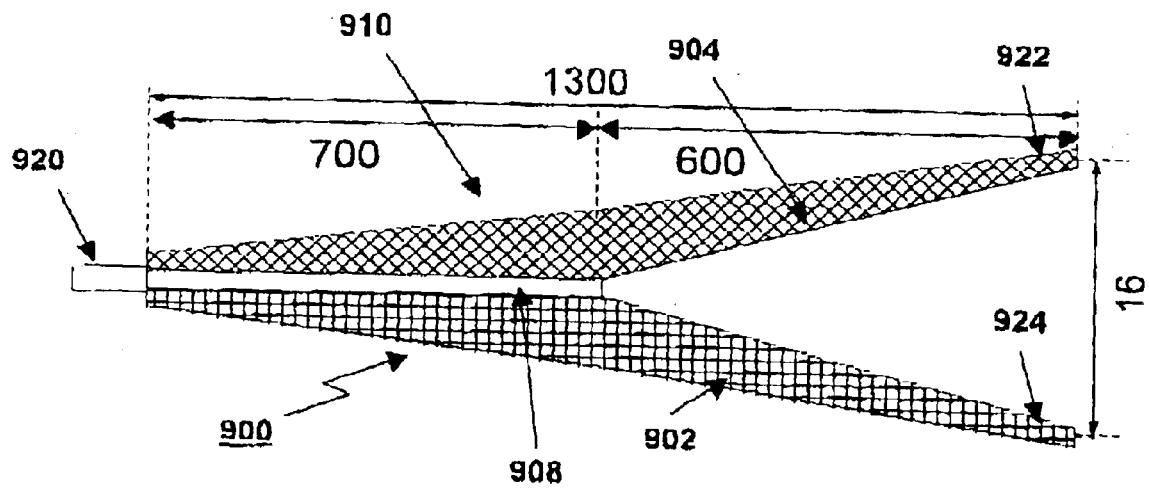
FIG. 9 shows a third embodiment of the present invention, a current injection optical space switch.

A third embodiment 900 of the present invention is a current injection switch, as shown in FIG. 9. In this embodiment of the invention, the local refractive index is reduced by the injection of electric current, supplied via electrodes 902, 904. Consequently, the regions of higher refractive index, into which the light preferentially couples, are defined by the regions away from the electrodes, where there is no current injection. The device of FIG. 9 comprises three distinct sections. Light enters via a 1.5 μm wide input waveguide, and then couples into the central broad area waveguide 910, which is tapered so as to increase in width from 3 μm to 8 μm over a length of 700 μm. The tapered central waveguide section provides for better modal evolution and lower crosstalk.

Light is coupled out of the device via two output waveguide ports, which are separated by an angle of approximately 1.7° and which feature a reducing lateral taper over a length of about 600 μm. The total length of the device is therefore about 1300 μm. Two tapered electrodes 902, 904 are patterned above the central tapered broad area waveguide 910, leaving a narrow 1 μm channel 908, the electrodes continuing along at least a portion of the length of the two tapered waveguides which act as the output ports of the switch.

Figure 10:
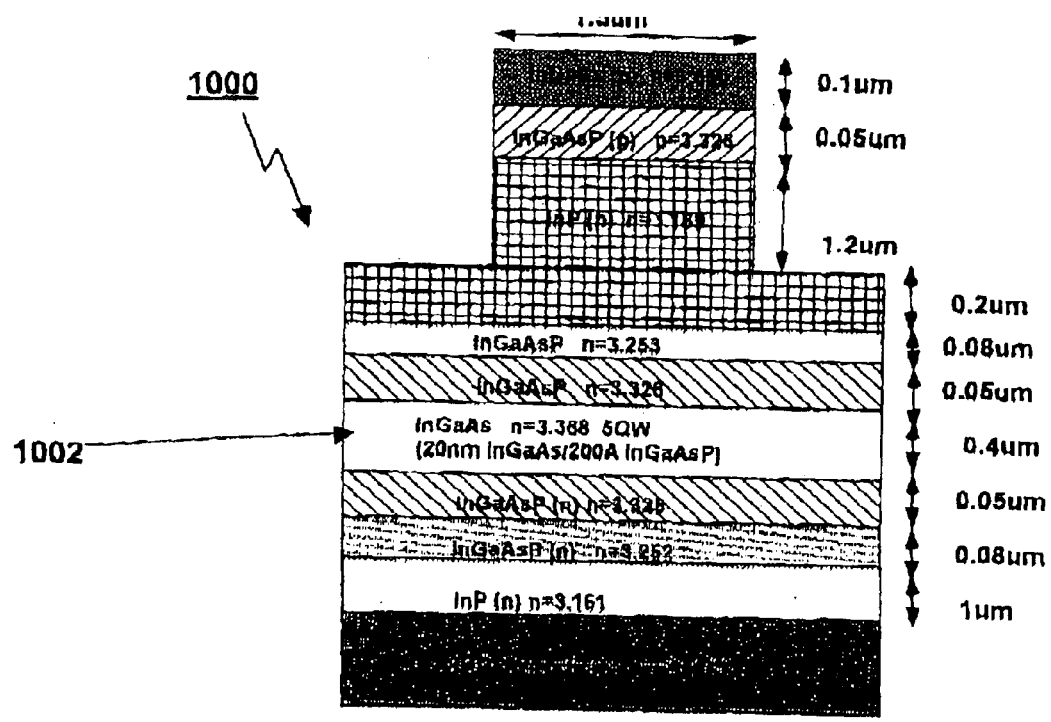
FIG. 10 is a cross section through the heterostructure of FIG. 9.

The switch 900 of FIG. 9 is based on a semiconductor multiple quantum well (MQW) waveguide structure, which contains five quantum wells (5 QW) 1002, each with a thickness of 20 nm. FIG. 10 shows a cross section through the heterostructure 1000 of the MQW waveguide, which comprises binary, ternary and quaternary semiconducting materials predominantly based on indium phosphide. The switch operates by forward biasing a portion of the waveguide associated with one of the output ports 922, 924. This is achieved through current injection via the appropriate electrode. The forward biased portion of the waveguide will experience a reduction in refractive index due to a range of effects, including plasma resonance, band filling, and band shrinkage. The reduced index will cause the incoming light to be preferentially steered towards the unbiased waveguide port, whose refractive index is relatively higher than the one that is forward biased.

Figure 11:
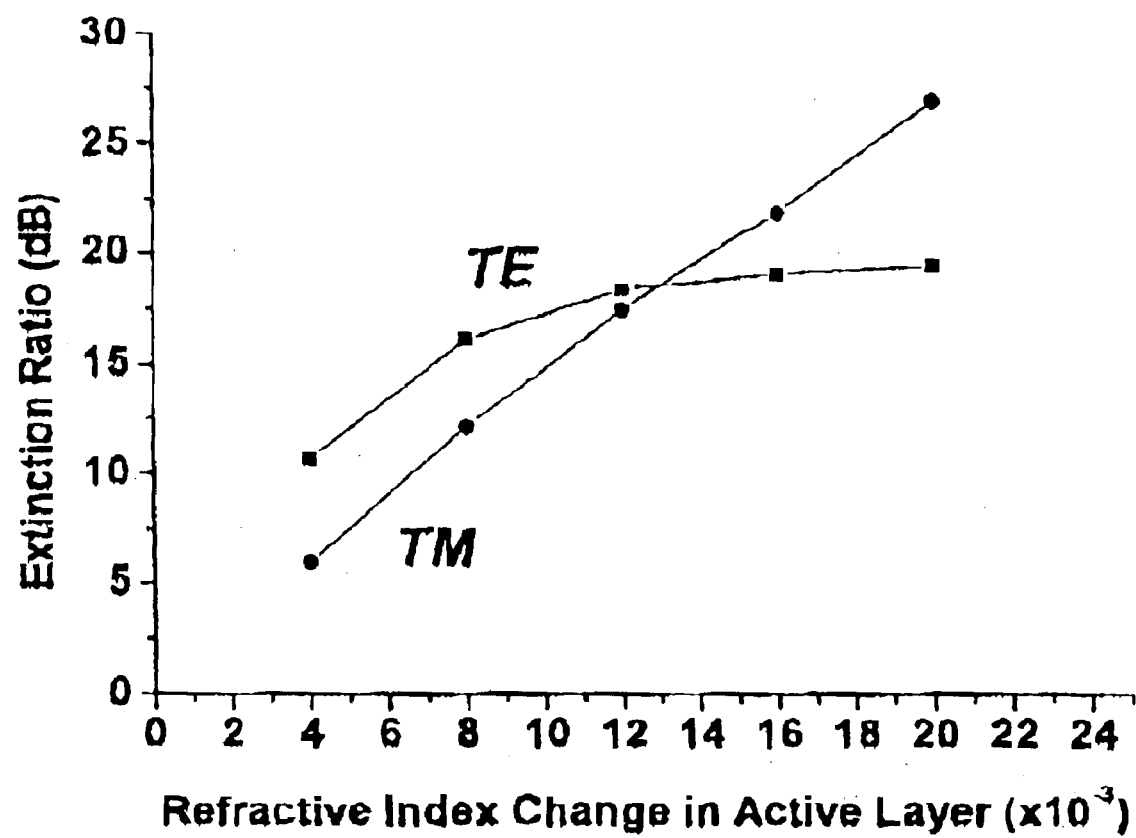
FIG. 11 shows extinction ratio versus refractive index change for TE and TM polarized light, for the switch of FIG. 9.
Figure 12:
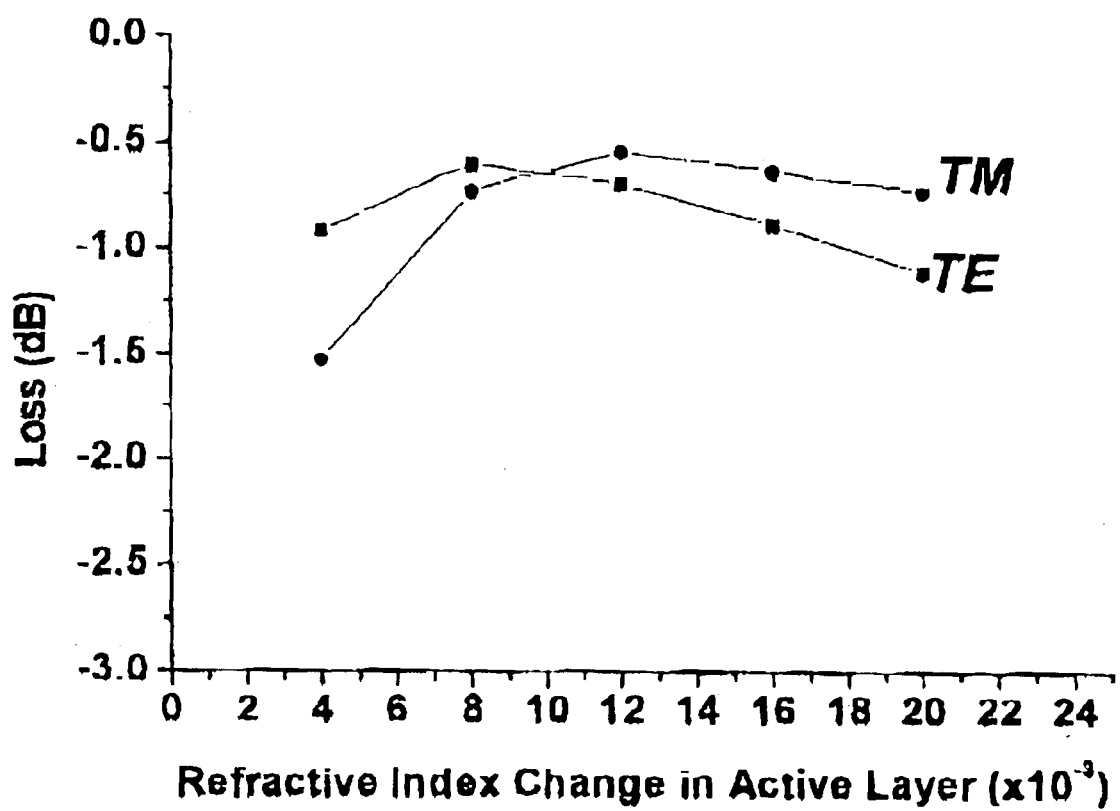
FIG. 12 shows propagation loss versus refractive index change for TE and TM polarized light, for the switch of FIG. 9.
Figure 13:
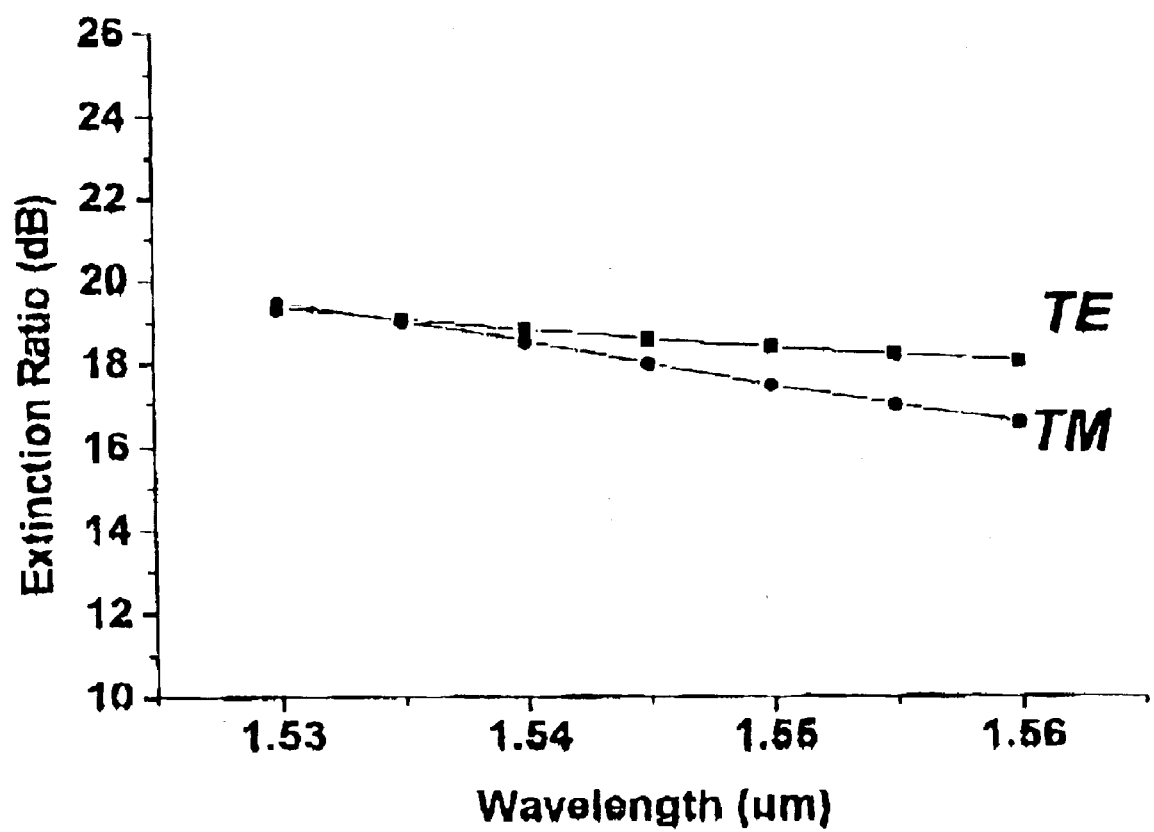
FIG. 13 shows extinction ratio versus C-band wavelength for TE and TM polarized light, for the switch of FIG. 9.
Figure 14:
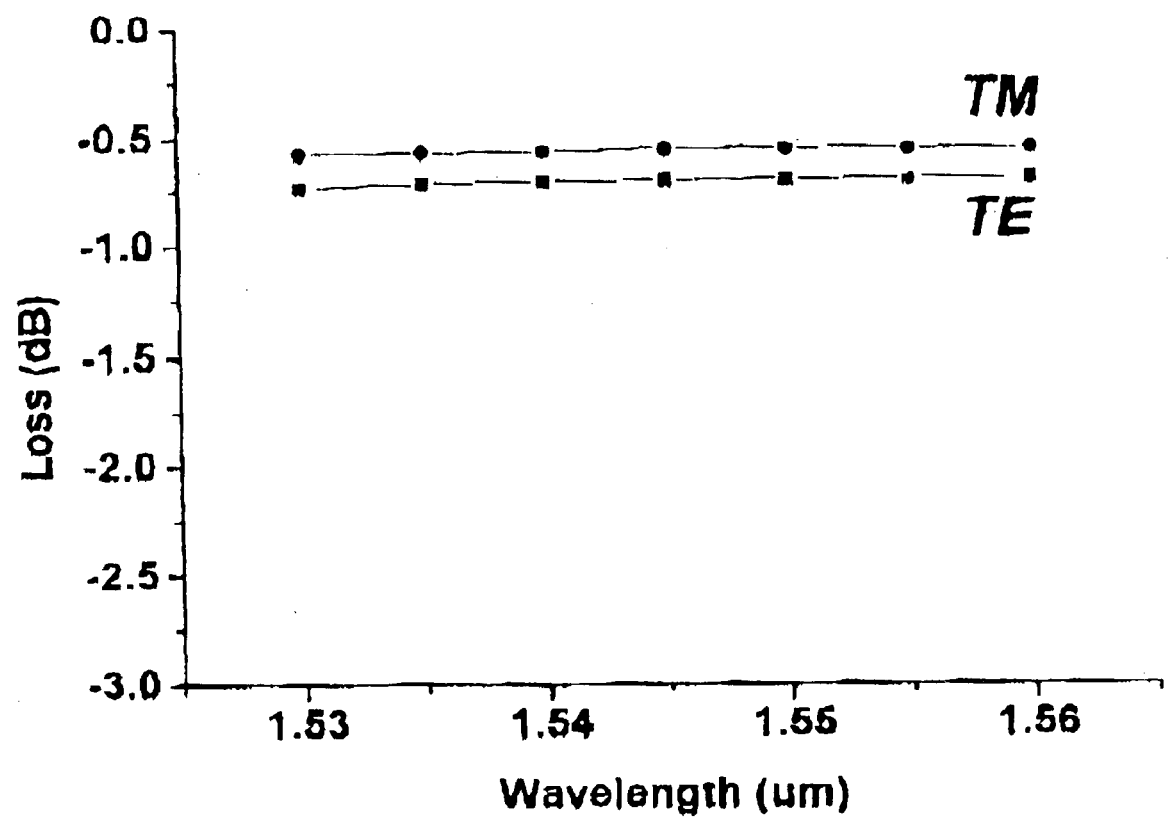
FIG. 14 shows propagation loss versus C-band wavelength for TE and TM polarized light, for the switch of FIG. 9.
Figure 15:
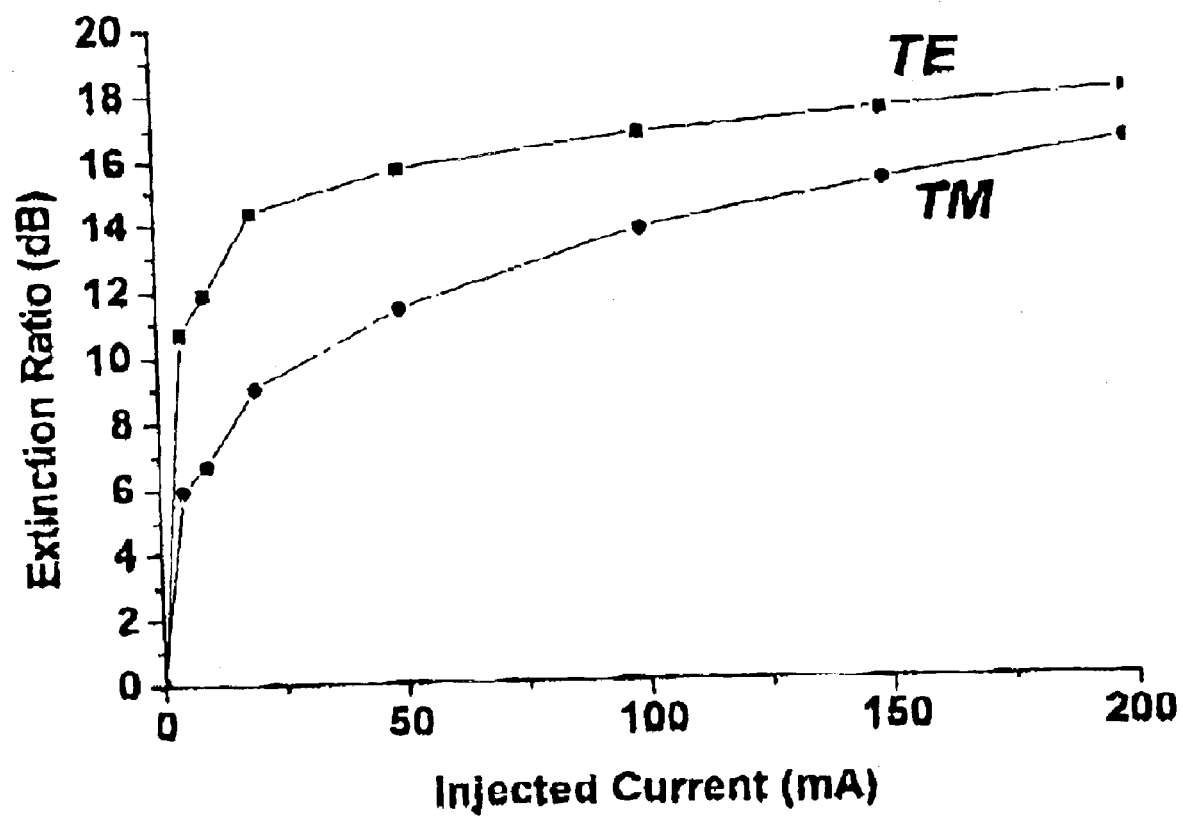
FIG. 15 shows extinction ratio versus injection current for TE and TM polarized light, for the switch of FIG. 9.
Figure 16:
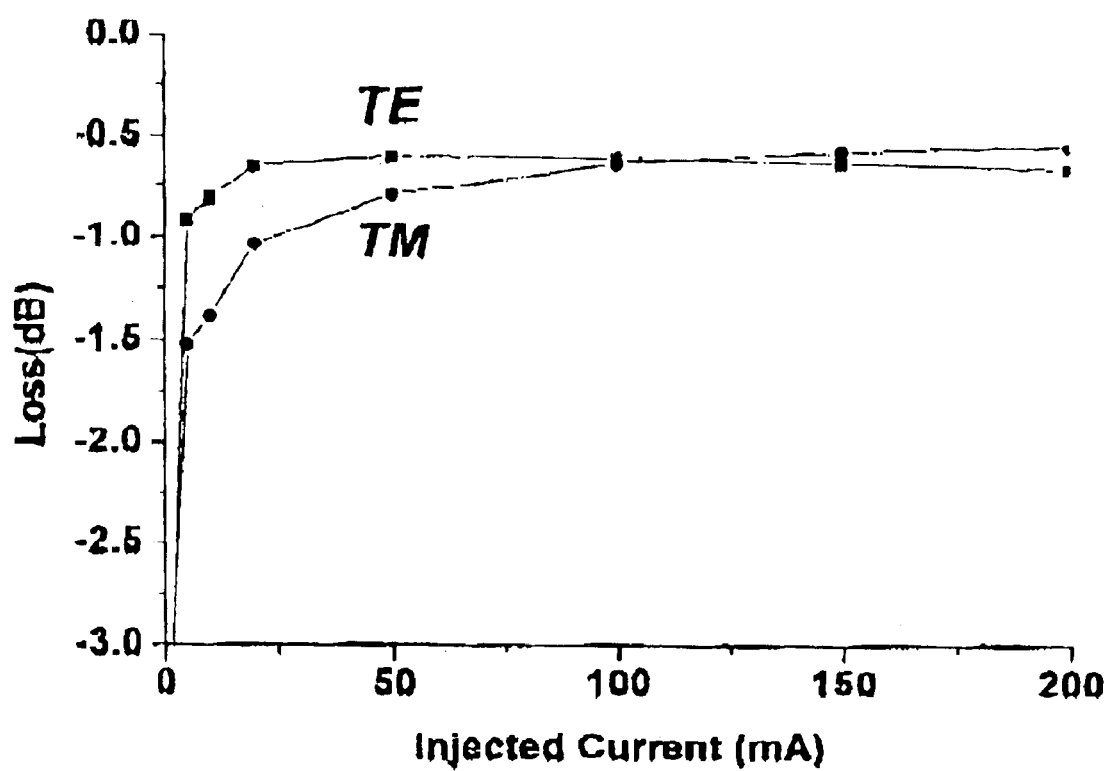
FIG. 16 shows propagation loss versus injection current for TE and TM polarized light, for the switch of FIG. 9.

Simulation results for the device shown in FIGS. 9 and 10 demonstrate that, by exploiting the carrier induced effect, an index change ($\Delta\eta$) of about 0.012 will result in a switching extinction ratio of approximately 18 dB and a transmission loss of approximately 0.7 dB, for both the TE and TM polarization modes. FIGS. 11 and 12 show, respectively, the dependence of extinction ratio and transmission loss on refractive index change, for both the TE and TM polarization modes of input light. As can be seen from the range of extinction ratio and loss experienced by both polarization states, the designed switch is relatively polarization insensitive. Simulations were also performed to determine the wavelength dependency of the extinction ratio and loss over the optical communications C-band. FIGS. 13 and 14 show consistent switching performance over the whole C-band (1528 nm to 1562 nm), with only a weak variation of extinction ratio. The dependences of the extinction ratio and transmission loss of the device on the level of injected current are shown in FIGS. 15 and 16, respectively. Again, consistent and relatively polarization insensitive behaviour is obtained over a wide range of injection current, above a minimum level of about 25 mA.

Figure 17:
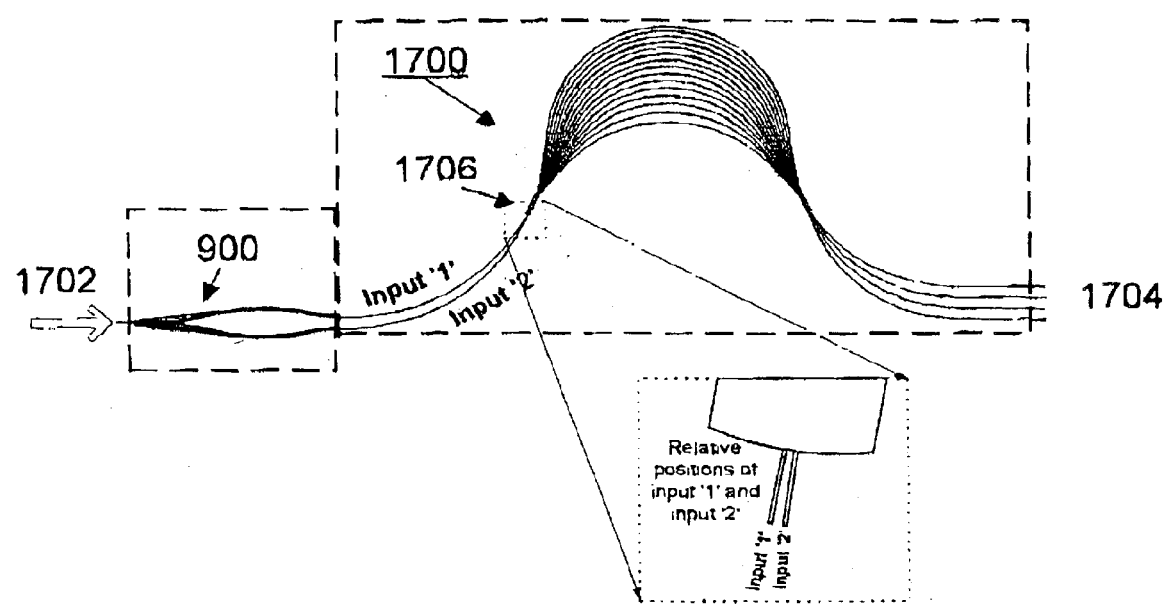
FIG. 17 shows the switch of FIG. 9 used as an interleaver with a 2×4 channel arrayed waveguide grating.
Figure 18:
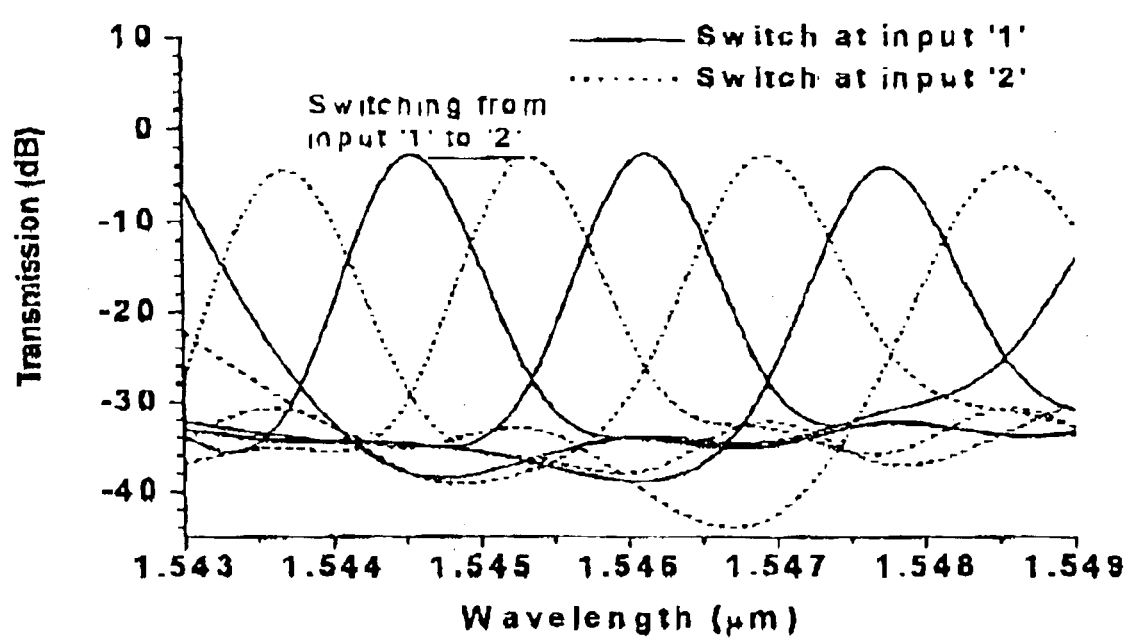
FIG. 18 shows the filtering response, transmission versus wavelength, of the device shown in FIG. 17; and, FIGS. 19A, 19B and 19C show the layout and operation of a fourth embodiment of the present invention, a 2×2 voltage controlled switch.

The current-injected optical space switch, described above, is designed to cater for applications that involve the demultiplexing of multiple optical wavelengths, by an arrayed waveguide grating (AWG) for example, but where simultaneous demultiplexing is not critical. Under these conditions, sets of different optical channels can be accessed sequentially by means of an optical space switch. One example of such an application is the optical channel monitor. The current-injected switch 900 of FIG. 9 can be used to provide an interleaving function in an AWG-based optical channel monitor. FIG. 17 shows the layout of such a switch, configured with a 2×4 channel AWG 1700. The four optical channels 1704 are spaced 1.6 nm apart in the transmission spectrum. By using the optical switch to route the input light signal to different spatial locations at the input to a free-propagating slab 1706 of the AWG through either one of inputs '1' or '2', the filtering response of the AWG will be wavelength shifted by 0.8 nm, as shown in FIG. 18. Consequently, eight channels are effectively demultiplexed in two sets of four channels each. This implementation, using an interleaver and AWG combination, doubles the number of channels that can be monitored. The usual stringent design requirements for an AWG with a large number of channels can thus be relaxed.

Figure 19:
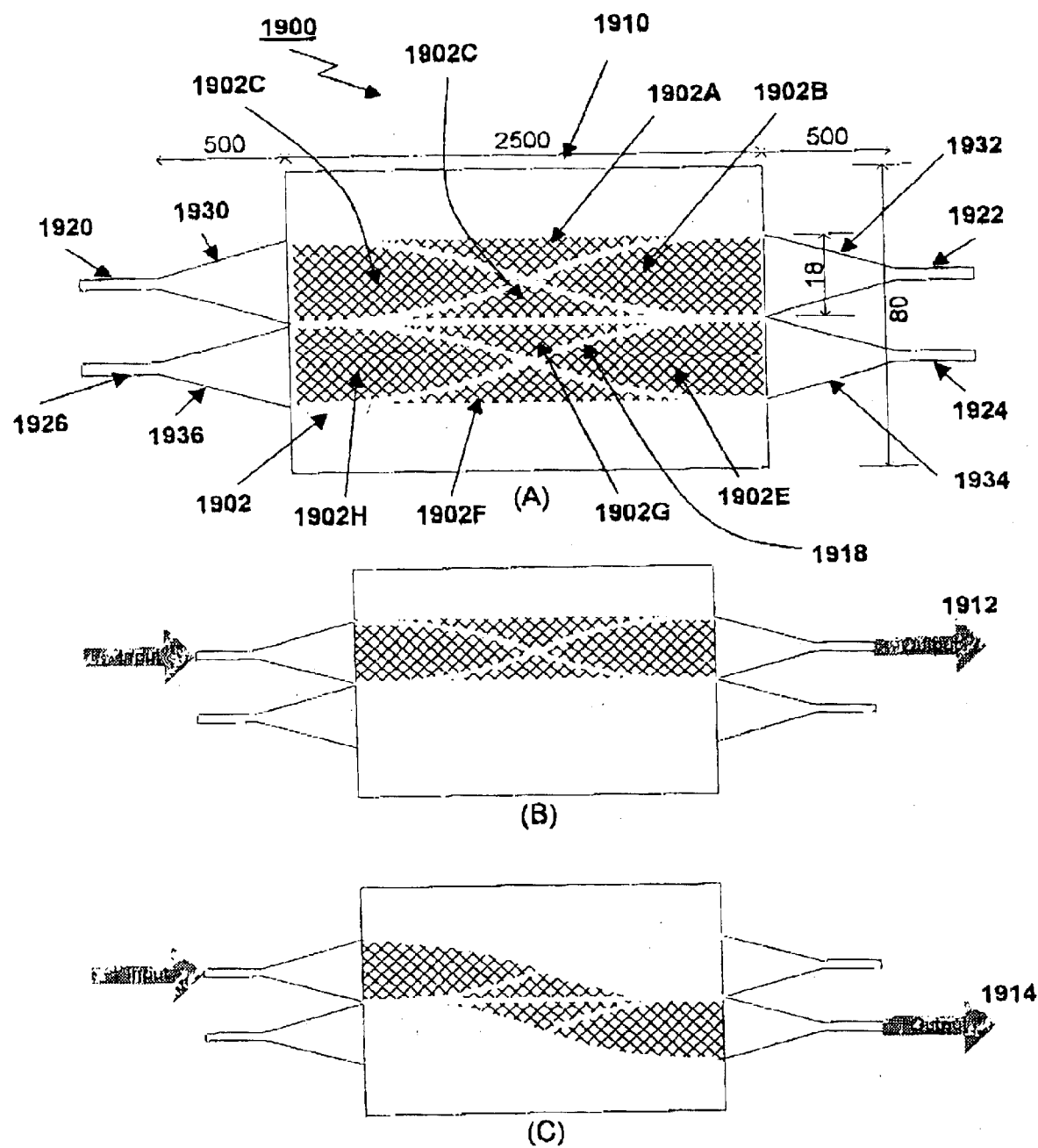

A fourth embodiment 1900 of the present invention is a 2×2 voltage controlled switch, as shown schematically in FIG. 19. In this example a large electrode 1902, located above a broad area waveguide 1910, is segmented into many smaller tapered electrodes 1902A–H, as illustrated in FIG. 19A. A particular set of electrodes can be activated to form a waveguide, which then routes the light to the desired output port 1922, 1924 (see FIGS. 19B and 19C). The size of the gap 1918 between electrodes is limited by lithographic techniques to around 1 μm, a limitation that can be detrimental to the efficient guidance of an optical beam to the designated port. However, the effects of this limitation can be substantially mitigated by transforming the optical mode to a much wider spatial profile. As shown in FIG. 19, this can be achieved by means of tapered access waveguides 1930, 1936 which adiabatically increase the beam size as it propagates from the input waveguide 1920, 1926 to the broad area waveguide 1910. Similarly, at the output ports 1922, 1924 of the broad area waveguide, matching tapered waveguides 1932, 1936 can be used to transform the transmitted beam back to its original size for propagation through any subsequent optical components. FIGS. 19B and 19C show the formation of the higher index waveguide region through application of a reverse bias voltage to selected segmented electrodes, thereby achieving bar state 1912 and cross state 1914 switching, respectively. The extinction ratio is calculated to be 15 dB for the cross state and over 27 dB for the bar state. The corresponding propagation losses are calculated to be approximately 12.7 dB and 1.2 dB, respectively. However, further optimization should lead to even better performance.

Thus it has been shown that the present invention is capable of providing fast and efficient optical space switching with very high extinction ratio, up to 30 dB for the first voltage-controlled optical space switch. The switches are also characterized by very low optical loss compared to conventional digital optical switches, which suffer from an inherent 3 dB loss arising from the use of a Y-branch. Moreover, this high performance can be achieved concomitantly with a reduced demand on the precision of electrode definition in the fabrication process, as compared to conventional digital optical switches. The present invention also provides flexibility in that, by appropriate adjustment of the tapered output waveguide dimensions, a higher extinction ratio can be achieved by compromising with a higher loss, and vice versa. Improved control and functionality in the optical routing of signals through the switch can be achieved by the use of carefully designed segmented electrodes.

As demonstrated, current injected space switches can also provide high extinction ratio switching, particularly when the controlling electrodes extend over a section of the output waveguides. Applications for this type of switch include the interleaving of optical signals entering an arrayed waveguide grating (AWG), in applications where strict simultaneous multiplexing and demultiplexing is not required. This technique affords an increase in channel capacity without an increase in either the device size itself or the size and number of associated components, such as detectors. Furthermore, there is no tightening of fabrication tolerances, usually associated with high channel number devices.

The present invention is not limited in scope or application by the above examples. Further variations may be contrived by a person skilled in the art. In particular, a single output port embodiment of the present invention may be used as an optical modulator, whereby the transmission of light by the device is either high or low, depending on the applied electrical signal. An optical modulator based on the present invention would be intrinsically broadband, high speed, low loss and polarization insensitive. In addition, optical switches that operate in accordance with the present invention can be cascaded to realize a semiconductor-based generalized N×M optical switch, with the same advantages of broad bandwidth, high speed, low loss and polarization insensitivity.

What is claimed is:

1. An optical device comprising a broad area optical waveguide section having a number of electrodes extending over at least a portion of the length of the broad area optical waveguide section, wherein the application of an electrical signal to an electrode causes a local change in effective refractive index of a region of the broad area optical waveguide section, the region being defined by the configuration of the electrode, thereby inducing a waveguide region in the broad area optical waveguide section such that light preferentially propagates along the induced waveguide region.

2. An optical device according to claim 1, in which the broad area optical waveguide section is tapered along at least a portion of its length.

3. An optical device according to claim 1, further comprising at least one input port and at least one output port.

4. An optical device according to claim 3, in which light propagates from an input port through the broad area optical waveguide section to an output port, the propagation path in the broad area optical waveguide section being determined in dependence on an electrically activated electrode.

5. An optical device according to claim 3, in which each port comprises a further optical waveguide.

6. An optical device according to claim 5, in which the further optical waveguide is tapered along at least a portion of its length.

7. An optical device according to claim 5, in which a further electrode extends over at least a portion of the further optical waveguide.

8. An optical device according to claim 1, in which each electrode is tapered along at least a portion of its length.

9. An optical device according to claim 1, further comprising means for applying a reverse bias voltage to a given electrode so as to induce a localized increase in the refractive index of a portion of the material located beneath the electrode, thereby providing lateral optical confinement of light propagating in the device.

10. An optical device according to claim 1, further comprising means for applying a forward bias voltage to a given electrode so as to induce a localized decrease in the refractive index of a portion of the material located beneath the electrode, thereby causing light propagating in the device to preferentially couple to surrounding regions of higher refractive index.

11. An optical device according to claim 1, in which at least a portion of the device comprises a semiconductor heterostructure.

12. An optical device according to claim 11, in which the heterostructure is fabricated from indium phosphide semiconducting materials.

13. An optical device according to claim 11, in which the heterostructure comprises at least one quantum well.

14. A multiple channel optical device comprising an optical multiplexer or optical demultiplexer optically coupled to an optical device according to claim 1.

15. An optical modulator for amplitude modulating an optical signal comprising an optical device according to claim 1.

16. A method of waveguiding in an optical device comprising a broad area optical waveguide section and an electrode extending over at least a portion of the length of the broad area optical waveguide section, comprising the step of applying an electrical signal to the electrode so as to induce a local change in effective refractive index of a region of the broad area optical waveguide section, the region being defined by the configuration of the electrode thereby inducing a waveguide region in the broad area optical waveguide section such that light preferentially propagates along the induced waveguide region.

17. A method according to claim 16, in which the electrical signal comprises a reverse bias voltage so as to induce a localized increase in the refractive index of a portion of the material located beneath the electrode and thereby provide lateral optical confinement of light propagating in the device.

18. A method according to claim 16, in which the electrical signal comprises a forward bias voltage electrode so as to induce a localized decrease in the refractive index of a portion of the material located beneath the electrode and thereby cause light propagating in the device to preferentially couple to surrounding regions of higher refractive index.

* * * * *